United States Patent [19]
Taylor et al.

[11] 3,946,687
[45] Mar. 30, 1976

[54] CONICAL BULBOUS BOW

[75] Inventors: Walter F. Taylor; William G. Rodgers, Jr.; John R. Chappell, all of Newport News, Va.

[73] Assignee: Newport News Shipbuilding and Drydock Company, Newport News, Va.

[22] Filed: Aug. 6, 1974

[21] Appl. No.: 495,166

[52] U.S. Cl. .............................................. 114/56
[51] Int. Cl.² ........................................ B63B 1/06
[58] Field of Search .................................. 114/56

[56] References Cited
UNITED STATES PATENTS

| | | | |
|---|---|---|---|
| 3,438,350 | 4/1969 | Gallin | 114/56 |
| 3,455,262 | 7/1969 | Weicker | 114/56 |
| 3,511,203 | 5/1970 | Buyscoll | 114/56 |
| 3,521,590 | 7/1970 | German et al. | 114/56 |
| 3,653,352 | 4/1972 | Tomiyama et al. | 114/56 |

*Primary Examiner*—Trygve M. Blix
*Assistant Examiner*—Stuart M. Goldstein
*Attorney, Agent, or Firm*—Stanley B. Green

[57] ABSTRACT

A novel bulbous bow for bulk carriers comprises a conical bulb with a faired nose, with the axis of the cone substantially parallel to the longitudinal axis of the ship. In a preferred embodiment the cone is a right circular cone and the faired nose is substantially a hemisphere. More particularly, the included angle of the cone is in the range of five to twenty degrees. Although the cone could be faired into the hull, preferably it is not. The longitudinal centerline of the bulb is located between 45 and 60 percent of the design draft below the design waterline. The preferred extension of the bulb, beyond the forward perpendicular, is proportional to the square of design speed with the proportionality factor in the range of 0.015 to 0.04 and preferably 0.035. The cross-sectional area of the bulb at the forward perpendicular may be in the range from 10 to 20 percent of the amidships cross-sectional area.

The bulb, comprising conical and hemispherical sections, is easier and less expensive to fabricate than some of the more complex shapes shown in the prior art.

21 Claims, 5 Drawing Figures

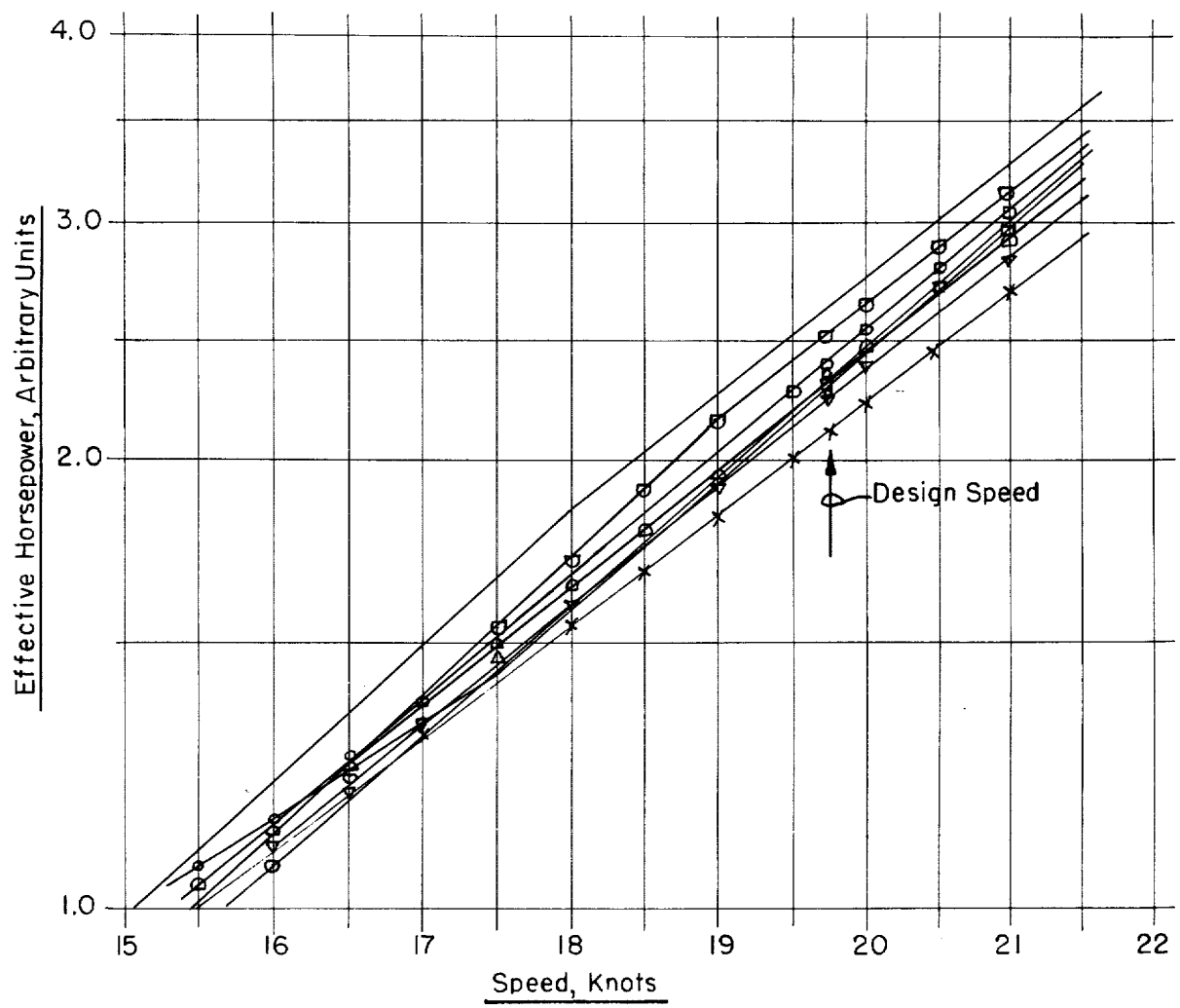

CONICAL BULBOUS BOW

FIELD OF THE INVENTION

The present invention pertains to the bow configuration of sea-going ships and more particularly, concerns a novel bulbous bow.

BACKGROUND OF THE INVENTION

Bulbous bows on ships have been known for 70 years or more. These bow configurations were, and are being used, in order to decrease the resistance of the water to the travel of the ship. Decreasing the resistance of the water to the ship's travel reduces the energy required to propel the ship bring about a number of desired results. For one thing, the amount of fuel required for a given velocity or a given distance of travel is decreased. Secondly, the size and therefore the cost of the ship's propulsion equipment can be reduced to attain a given velocity. Alternatively, with the reduced resistance obtained as a result of a bulbous bow a ship with a given propulsion equipment can attain greater velocities.

Although such bulbous bows have been used for quite a period of time, the particular shape or configuration of the bulbous bow suggested by prior users and disclosures thereof have been many and varied. The complexity of the physical effects which dictate the optimum bulb configuration has led the field to heavily rely on empirical results. Typical prior art bulb configurations include the faired bulb of Weicker (U.S. Pat. No. 3,455,262); the knuckled bulb of Csupor (U.S. Pat. No. 3,433,194); the blunt bulb of Taniguchi (U.S. Pat. No. 3,362,369); a relatively pointed bulb of Gray (U.S. Pat. No. 3,306,243); the spherical bulbs of Inui (U.S. Pat. No. 3,180,299) and Laskey (U.S. Pat. No. 3,247,822); the "flattened" bulb of German (U.S. Pat. No. 3,521,590) and the cylindrical bulb of Tomiyama (U.S. Pat. No. 3,653,352). In addition to the foregoing, Eckert (U.S. Pat. No. Re. 26,997) discloses a bulb which has a part spherical and part roughly conical portions.

SUMMARY OF THE PRESENT INVENTION

The present invention provides an improved bulbous bow configuration which exhibits substantially less resistance when combined with a ship's hull. The bulbous bow of our invention comprises a faired nose and a conical portion connecting the faired nose to the prow of the ship. In particular, tests have indicated that when the axis of the cone is substantially parallel to the longitudinal axis of the ship, the resistance of the hull-bow combination shows a distinct improvement over the prior art hull-bulbous bow combinations.

In a preferred embodiment of the present invention, the conical portion of the bulb comprises a right circular cone with an included angle in the range of five to twenty degrees. A preferred value for the included angle of the cone is 9°. Although the bulbous bow can be faired into the lines of the hull we prefer that fairing at the cone-hull interface be eliminated. Furthermore, in a preferred embodiment the faired nose is hemispherical. Although a right circular cone is preferred other conical shapes such as elliptical could be employed.

The conical and spherical components of our bulbous bow simplify the manufacturing in comparison with the more complex shapes of bulbous bows disclosed in the prior art.

BRIEF DESCRIPTION OF THE DRAWINGS

In the drawings, like reference characters identify identical apparatus and futhermore in which;

FIG. 5 illustrates the results of model tests carried out by us comparing the balbous bow of our invention with prior art bulbous bows.

DETAILED DESCRIPTION OF THE INVENTION

Figure 1:
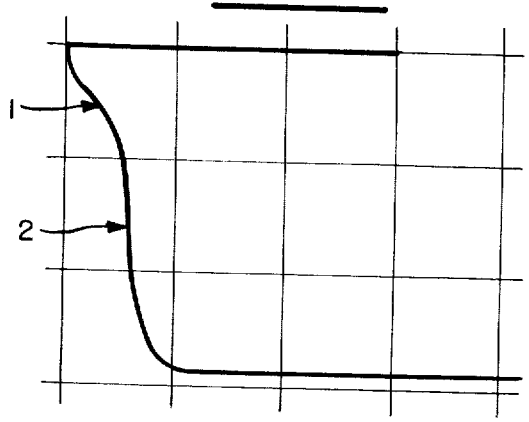
FIG. 1 is a bow of a bulk carrier without a bulbous bow.

FIG. 1 is a profile of the bow 2 of a bulk carrier 1 which does not have a bulbous bow. This bow configuration was used in our model tests in order to provide a basis of comparison between the bulbous bow of our invention, other bulbous bows including prior art bulbs, and a model with no bulbous bow.

Figure 2:
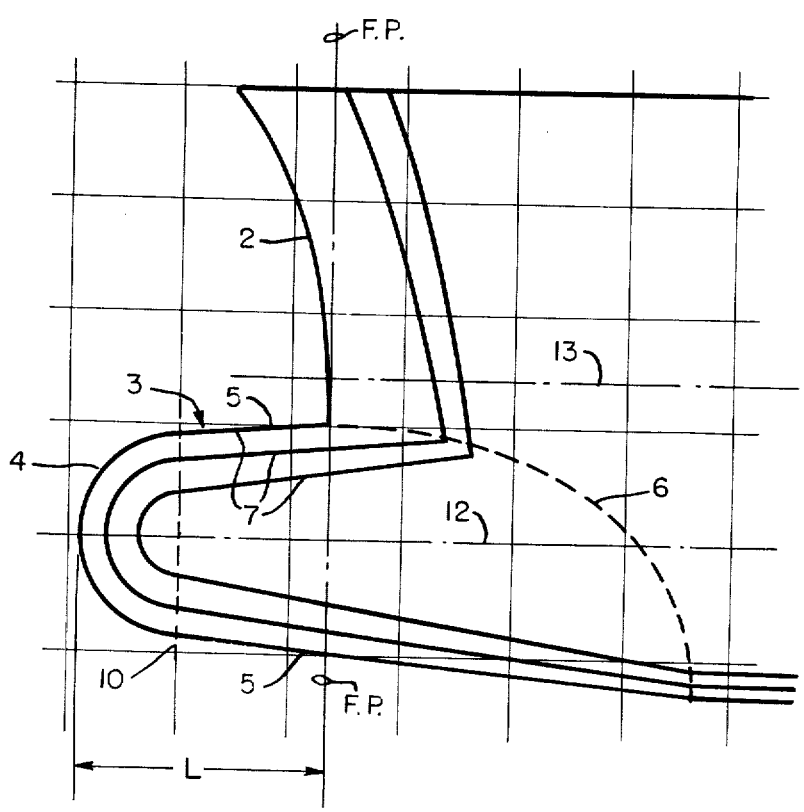
FIG. 2 is a profile of a bulk carrier with a bulbous bow in accordance with the principles of our invention which shows the buttock lines of the bow.

FIG. 2 is a profile of a bow 2 with a bulbous bow in accordance with the principles of our invention. The bulbous bow 3 comprises a faired nose 4 and a conical portion 5. In the particular embodiment illustrated in FIG. 2, the faired nose 4 comprises a hemisphere and the conical portion 5 comprises a right circular cone. Furthermore, as illustrated in FIG. 2, the conical portion 5 has an included angle of approximately nine degrees which is the angle we prefer. However, any angle in the range of 5° to 20° could be used.

The nose of the bulb is attached to the conical portion at the location of dashed line 10. FIG. 2 also illustrates the location of the bulb 3 with respect to the forward perpendicular (F.P.). As is well known to those skilled in the art, the forward perpendicular represents an imaginary line, perpendicular to the water plane, which passes through the point of intersection of the stem with the water at the design water line of the ship. FIG. 2 also illustrates that the longitudinal centerline 12 of the bulb is parallel to the longitudinal axis 13 of the ship 1.

The conical portion of the bulb 3 is attached to the hull at the location of the dashed line 6. Although it is possible to fair the bulb into the lines of the hull of the ship 1, we prefer that fairing not be used. The results of the model tests we have made, which are referred to below, can be interpreted as showing that the conical bulb without fairing exhibits less resistance than a similar conical bulb with fairing.

Buttock lines 7 represent the intersection of vertical planes parallel to the long axis of the ship with the bow and with the ship's hull.

Figure 3:
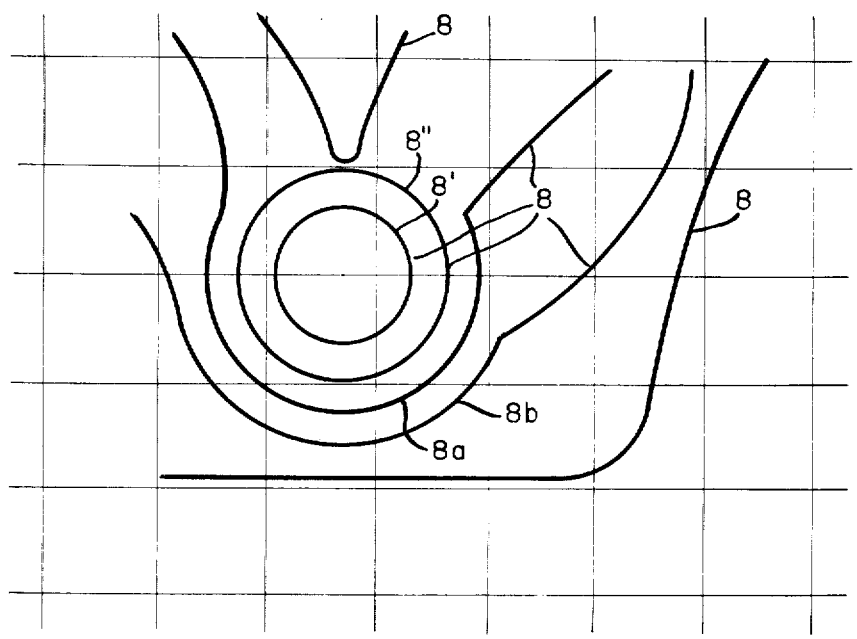
FIG. 3 shows a plurality of transverse vertical sections of a bulbous bow in accordance with the teachings of this invention.

FIG. 3 illustrates a plurality of transverse vertical sections through the bulbous bow. The lines 8 represent intersections of vertical planes perpendicular to the long axis of the ship with the bow at various distances back from the nose of the bow. The lines 8' and 8'' illustrate the spherical nature of the nose 4 whereas the lines 8a and 8b illustrate, in part, the conical portion 5 of the bulbous bow.

Figure 4:
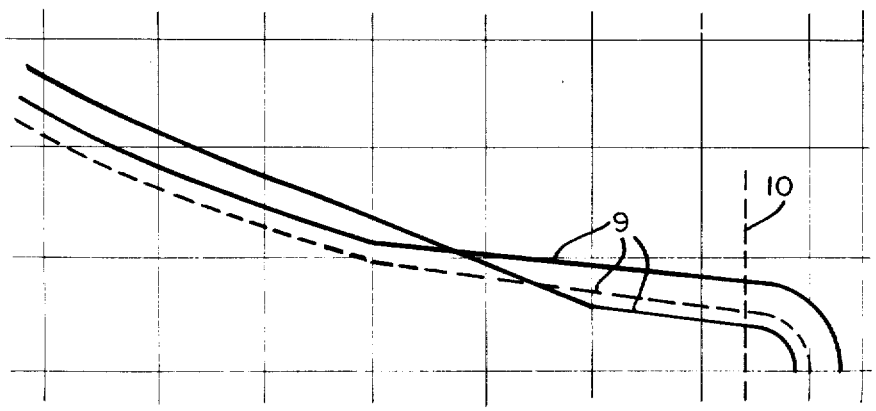
FIG. 4 shows a plurality of water lines of a bulbous bow in accordance with the principles of our invention.

FIG. 4 represents water lines at the bow. The lines 9 represent the intersection of the bow with planes parallel to the water. The dashed line 9 represents a hidden water line. In this figure, as in FIG. 2, the line 10 represents the intersection of the nose of the bulb with the conical portion of the bulb.

Model tests were carried out in order to test the efficacy of the bulbous bow of the present invention in comparison with several other types of configurations of bulbs, and also in comparison with a nonbulbous bow. The models of the various bulbs were tested in a model towing basin on a hull such as that illustrated in FIG. 1. The particular configuration of the hull 1 used in the model tests is detailed in TABLE 1, below.

TABLE 1

| Length between perpendiculars | 900 feet |
|---|---|
| Beam | 135 feet |
| Draft | 36 feet |
| Design Speed | 19.75 knots |
| Froude No. | 0.20 |
| Block coefficient | 0.76 |
| Prismatic coefficient | 0.77 |

In total, 10 models were tested, one of which did not include a bulbous bow so as to give a base line for the tests. Table 2 lists the results of the tests along with the characteristics of the different bulbous bows tested. In Table 2 Bulb No. 0 refers to the model without a bulbous bow, and bulbous bows 1–9 were tested. In the second column of Table 2, under the heading "Type," a short description of the bulbous bow is given. In addition, three of the bows, identified in Table 2 are similar to disclosures in prior patents and they are specifically identified. Furthermore, a fourth bulb "cylindrical B" was similar to a bulbous bow disclosed in the identified publication. The other bows 2, 4, and 7 were modifications of various other bows.

The third column of Table 2 indicates the projection of the bulbous bow forward of the forward perpendicular in feet, translated into full scale. The next column indicates the submergence of the longitudinal centerline of the bulbous bow below the water line as a percentage of the design draft of the vessel. The next column lists the relative cross-sectional area of of the bulb at the forward perpendicular compared to the cross-sectional area of the hull, amidships. Finally, the last column lists the percentage improvement, or decrease in resistance of the bulbous bow and hull combination as compared to the hull without a bulbous bow, at the design speed of the ship model.

significantly less resistance than any of the other bulbous bows tested.

FIG. 5 illustrates the relationship between the effective horsepower required to drive the modeled ships as a function of speed. Of course, the lower the effective horsepower at any given speed, the lower is the resistance of the bow-hull combination and therefore the more desirable. As is apparent, from FIG. 5, above 18 knots the combination with the least resistance was that of the present invention, that is either conical A or conical B. The resistance of these two bulbs is so similar that individual plots would be indistinguishable in FIG. 5. Therefore the characteristic is shown on one curve.

In a second series of tests, six different conical bulbous bow configurations were tested, including conical A and conical B, to determine the effects of changing bulb size and location. The projection of the bulb ahead of the forward perpendicular was varied from about 20 feet to about 31 feet, the submergence of the longitudinal centerline of the bulb was varied between about fifty percent to about 55 percent of the design draft and the relative area of the bulb was varied between about 12 and 16 percent, all as shown in Table 3 below. The towing conditions used in order to generate the data illustrated in Table 3 were the same as those utilized in obtaining the data found in Table 2. As a result, the percent improvement figures are directly comparable.

TABLE 3

| Conical Bulbs | Projection Ahead of F.P. Feet | Submergence of L.C.L. % of Draft | Relative Area, % | Percent Imp. |
|---|---|---|---|---|
| A | 30 | 50.2 | 15.3 | 18.4 |
| B | 20.8 | 50.2 | 15.3 | 17.3 |
| C | 25.4 | 50.2 | 15.3 | 18.0 |
| D | 30.7 | 55.1 | 12.5 | 17.3 |
| E | 26 | 55.1 | 12.5 | 12.6 |
| F | 25 | 54.2 | 14.8 | 11.1 |

In the first column of Table 3 the distance the bulb projects ahead of the forward perpendicular is given in feet. The second column lists the submergence of the longitudinal centerline of the bulb as a percent of the design draft of the vessel. The third column lists the relative area of the bulb at the forward perpendicular compared to the cross-sectional area of the hull amidships. Finally, the percent improvement identifies the

TABLE 2

| Bulb No. | Type | Projection Ahead of F.P. feet | Submergence of L.C.L. Below waterline % of draft | Relative Area % | Percent Imp. |
|---|---|---|---|---|---|
| 0 | none | N/A | N/A | 0 | — |
| 1 | Faired(1) | 20.5 | N/A | 4.4 | 12.3 |
| 2 | Cylindrical A | 28.0 | 51 | 12.9 | 13.8 |
| 3 | Knuckled(2) | 23.0 | N/A | 5.5 | 13.8 |
| 4 | Modified Cylindrical | 26.0 | 63.9 | 12.8 | 11.7 |
| 5 | Blunt(3) | 13.8 | N/A | 3.3 | 5.2 |
| 6 | Cylindrical B(4) | 26.0 | 63.9 | 11.0 | 8.9 |
| 7 | Elliptical | 26.0 | 55.5 | 9.7 | 11.5 |
| 8 | Conical A | 30.0 | 50.2 | 15.3 | 18.4 |
| 9 | Conical B | 20.8 | 50.2 | 15.3 | 17.3 |

(1)Similar to U.S. Pat. No. 3,455,262
(2)Similar to U.S. Pat. No. 3,433,194
(3)Similar to U.S. Pat. No. 3,362,369
(4)Similar to "Recent Studies of Models with Extreme Bulbous Bows" J. J. Muntjewerf, Wageningen, Netherlands Translation 325 by U.S. Joint Publications Research Services.

Reference to Table 2 illustrates that the two conical bulbous bows, conical A and conical B, both exhibited decrease in effective horsepower of the bulb-hull combination as compared with the horsepower required for the hull alone. It will be seen that four of the six bulbs, including conical A and conical B were found to have significantly less resistance than any of the non-conical types of bulbs.

In a third series of tests the draft of the model was increased from 36 feet to 48 feet to determine the efficacy of the conical bulb at deeper drafts. At the 48 foot draft, the percent improvement between the hull with no bulb and the hull with the conical bulb was not as great as at the 36 foot draft but nevertheless was significant. Instead of an 18 percent improvement, the improvement was shown to have been approximately 10 percent.

While these tests were necessarily carried out with a specific hull which was designed specifically for carrying LNG at constant draft, it should be noted that the test results and the conical bulbous bow of this invention are not restricted to that use but are applicable to a wide range of ship types and sizes.

In particular, we have found that the desired projection of the bulb ahead of the forward perpendicular can be related to the design speed of the vessel by the equation: $L = Cv^2$, where $L$ is the projection of the bulb ahead of the forward perpendicular (in feet) and $v$ is the design speed of the vehicle (in feet per second). In this equation $C$ is a factor which can vary in the range of 0.015 to 0.04 to suit the requirements of the owner or designer. In the case of the model tested, this gives a range for L between 17 and 44 feet. For a preferred bulb, conical A, the projection is thirty feet. This yields a preferred C value of 0.035 for the conical bulb.

We have expressed the submergence of the longitudinal centerline of the bulb as a fraction of the design draft of the vessel. The tests discussed above, interpreted in light of present naval architecture practice, indicate that the submergence may vary between about 45 and 60 percent of the design draft. The conical A bulb had a submergence of approximately 50 percent, thus this is a preferred value for a bulb of our invention.

The same tests, and other naval architecture considerations indicate that the cross-sectional area of the bulb, at the forward perpendicular, may have a wider range than the 12 to 16 percent of the amidships cross-sectional area used in our tests. A range of approximately 10 to 20 percent is more realistic. The cross-sectional area of conical A was approximately 15 percent.

Another significant feature of the conical bulb is its ease of fabrication. Since it includes only a cone and a faired nose, it is much easier to fabricate out of steel plates than many of the other bulbs tested, which comprise irregular or complex curvatures. This feature is especially evident when the faired nose is a hemisphere.

Although the drawings illustrate a right cone and a faired nose of hemispherical shape, those with ordinary skill in the art will understand, from a reading of this description, that many other conical configurations and faired noses other than hemispheres will be substantially as advantageous.

What is claimed is:

1. A ship with a bulbous bow, said bulbous bow comprising,
 a conical portion with a larger and a smaller end,
 a faired nose attached at said smaller end,
 said larger end attached to the ship's prow, said conical portion extending at least to the forward perpendicular of said ship, with a longitudinal center line of said conical portion substantially parallel to the longitudinal axis of said ship,
 said bulbous bow projecting forward of said ship's forward perpendicular a length in feet equal to $Cv^2$ where $v$ is the design speed of said ship in feet per second and $C$ is in the range of 0.015 to 0.04.

2. The ship of claim 1 wherein said conical portion has an included angle in the range between 5° and 20°.

3. The ship of claim 1 wherein C is substantially 0.035.

4. The ship of claim 1 wherein said conical portion is a portion of a right circular cone.

5. The ship of claim 1 wherein said faired nose is a hemisphere.

6. The ship of claim 1 wherein said longitudinal centerline is submerged below said ship's water line approximately 50% of said ship's design draft.

7. The ship of claim 1 wherein said bulbous bow has a cross-sectional area at the forward perpendicular of said ship which is approximately 15% of said ship's cross-sectional area amidships.

8. The ship of claim 1 wherein said conical portion is attached directly to said prow with substantially no fairing.

9. The ship of claim 1 wherein said ship operates at essentially constant draft.

10. The ship of claim 1 wherein said conical portion has an included angle of 9°.

11. A ship with a bulbous bow, said bulbous bow consisting essentially of,
 a conical portion with a larger and a smaller end,
 a faired nose attached at said smaller end,
 said conical portion extending at least as far as a forward perpendicular of said ship with the larger end of said conical portion attached to the ship's prow, the longitudinal center line of said conical portion substantially parallel to the longitudinal axis of said ship.

12. The ship of claim 11 wherein said conical portion has an included angle in the range between 5° and 20°.

13. The ship of claim 11 wherein said bulbous bow projects forward of said ship's forward perpendicular a length in feet equal to $Cv^2$ where $v$ is the design speed of said ship in feet per second and $C$ is in the range of 0.015 to 0.04.

14. The ship of claim 13 wherein C is substantially 0.035.

15. The ship of claim 11 wherein said conical portion is a portion of a right circular cone.

16. The ship of claim 11 wherein said faired nose is a hemisphere.

17. The ship of claim 11 wherein said longitudinal center line is submerged below said ship's water line approximately 50% of said ship's design draft.

18. The ship of claim 11 wherein said bulbous bow has a cross-sectional area at the forward perpendicular of said ship which is approximately 15% of said ship's cross-sectional area amidships.

19. The ship of claim 11 wherein said conical portion is attached to said prow with substantially no fairing.

20. The ship of claim 11 wherein said ship operates at essentially constant draft.

21. The ship of claim 11 wherein said conical portion has an included angle of 9°.

* * * * *